United States Patent

Hasegawa

Patent Number: 6,153,319
Date of Patent: Nov. 28, 2000

[54] SPIN-VALVE TYPE THIN FILM ELEMENT

[75] Inventor: Naoya Hasegawa, Niigata-ken, Japan

[73] Assignee: Alps Electric Co., Ltd., Japan

[21] Appl. No.: 09/154,648

[22] Filed: Sep. 17, 1998

[30] Foreign Application Priority Data

Sep. 17, 1997 [JP] Japan ................................. 9-251797

[51] Int. Cl.$^7$ ....................................................... G11B 5/66
[52] U.S. Cl. ................ 428/692; 428/694 T; 428/694 TS; 428/694 R; 428/900; 360/113; 324/252
[58] Field of Search ........................... 428/694 T, 694 TS, 428/694 R, 692, 900; 360/113; 324/252

[56] References Cited

U.S. PATENT DOCUMENTS 5,159,513  10/1992  Dieny ........................................ 360/113
5,206,590   4/1993  Dieny et al. ............................... 324/252
5,373,238  12/1994  McGuire et al. ........................... 324/252

Primary Examiner—Leszek Kiliman
Attorney, Agent, or Firm—Brinks Hofer Gilson & Lione

[57] ABSTRACT

Magnetization of the free magnetic layer can be induced along the X-direction (the track direction) shown in the drawing due to the inverse magnetostriction effect even when a tensile stress is applied along the Y-direction (the height direction) of the free magnetic layer 4 shown in the drawing, because the saturation magnetostriction constant $\lambda s$ of the free magnetic layer 4 is adjusted to within the range of $-2 \times 10^{-6} \leq \lambda s \leq 0$, more preferably $-1 \times 10^{-6} \leq \lambda s \leq 0$, thereby allowing magnetization of the free magnetic layer to be favorably reversed to approach asymmetry to zero (improve asymmetry).

7 Claims, 7 Drawing Sheets

SPIN-VALVE TYPE THIN FILM ELEMENT

BACKGROUND OF THE INVENTION

1. Field of the Invention

The present invention relates to a so-called spin-valve type thin film element in which electric resistance varies with the relation between magnetization direction of a pinned magnetic layer and magnetization direction of a free magnetic layer being affected with the external magnetic field, especially to a spin-valve type thin film element formed so as to be able to obtain a favorable asymmetry.

2. Description of the Related Art

FIG. 8 is a cross section close to the ABS surface (Air Bearing Surface) of a spin-valve type thin film element (spin-valve type tin film magnetic head) for sensing recording magnetic field from a recording medium such as a hard disk.

An anti-ferromagnetic layer 30, a pinned magnetic layer 2, a non-magnetic conductive layer 3 and a free magnetic layer 31 are layered in this spin-valve type thin film element, bias layers 5, 5 being formed on both side.

Usually, a Fe—Mn (iron—manganese) alloy film or Ni—Mn (nickel—manganese) alloy layer is used for the anti-ferromagnetic layer 30, a Ni—Fe (nickel—iron) alloy layer is used for the pinned magnetic layer 2 and free magnetic layer 31, a Cu (copper) film is used for the non—magnetic conductive layer 3 and a Co—Pt (cobalt—platinum) alloy layer is used for the bias layers 5, 5. The reference numerals 6 and 7 refer to an underlaying layer and protective layer formed of a non-magnetic material such as Ta (tantalum).

As shown in the figure, the anti-ferromagnetic layer 30 and pinned magnetic layer 2 are formed in direct contact with each other and the pinned magnetic layer 2 are put into a single magnetic domain state along the Y-direction (the height direction) by an exchange anisotropic magnetic field arising from an exchange coupling at the interface between the pinned magnetic layer and anti-ferromagnetic layer 30, the magnetization direction being pinned along the Y-direction. The exchange anisotropic magnetic field is generated at the interface between the anti-ferromagnetic layer 30 and pinned magnetic layer 2 by applying an annealing treatment (a heat treatment) while a magnetic field is applied along the Y-direction when the anti-ferromagnetic layer 30 is composed of a Ni—Mn alloy film. When the anti-ferromagnetic layer 30 is composed of a Fe—Mn alloy film, on the other hand, the exchange anisotropic magnetic field is generated at the interface between the anti-ferromagnetic layer 30 and pinned magnetic layer 2 by forming the film in a magnetic field.

The magnetization direction of the free magnetic layer 31 is aligned along the X-direction under the influence of the hard bias layers 5, 5 magnetized along the X-direction (the track direction).

In the method for producing the spin-valve type thin film element, six layers from the underlayer 6 to the protective layer 7 are at first formed and the side face of the foregoing six layers is shaved off in the following etching step such as an ion-milling process to form inclined faces, followed by forming the hard bias layers 5, 5 on both side of the six layers.

A static current (sensing current) is imparted in this spin—valve type thin film element from conductive layers 8, 8 to the pinned magnetic layer 2, non-magnetic conductive layer 3 and free magnetic layer 31. While the scanning direction of the recording medium such as the hard disk is Z-direction, magnetization of the free magnetic layer 4 turns from X-direction to Y-direction when a leakage magnetic field from the recording medium is applied along the Y-direction. Electric resistance is varied in response to the relation between the variation of the magnetization direction in this free magnetic layer 31 and the pinned magnetization direction of the pinned magnetic layer 2, and the leakage magnetic field from the recording medium is sensed by the voltage changes based on the variation of this electric resistance level.

Only the ABS surface (the front surface) is exposed to outside and the other surfaces are covered with insulation films of, for example, $Al_2O_3$ in the spin-valve type thin film element shown in FIG. 8. Since the spin-valve type thin film element has a multi-layer structure of metallic films, the thermal expansion coefficient of the spin-valve type thin film element is made to be larger than the thermal expansion coefficient of the insulation film covering the spin-valve type thin film element. Therefore, a tensile stress along the Y-direction (the height direction) shown in the drawing is applied on the spin-valve type thin film element.

When magnetostriction of the free magnetic layer 31 constituting the spin-valve type thin layer element assumes a positive value in the state described above, magnetization of the free magnetic layer 31 is induced by being inclined to the Y-direction shown in the drawing owing to a reverse magnetostrictive effect.

As hitherto described, magnetization of the free magnetic layer 31 is aligned along the X-direction (the direction of track width) shown in the drawing owing to the free bias layers 5, 5 and magnetization of the free magnetic layer 31 is fluctuated by the leakage magnetic field from the recording medium, thus sensing the leakage magnetic field from the recording medium.

However, when a tensile stress along the Y-direction shown in the drawing is applied to the spin-valve type thin film element and magnetostriction of the free magnetic layer 31 assumes a positive value, the magnetization is not favorably reversed against the leakage magnetic field from the recording medium because magnetization of the free magnetic layer is induced by being inclined to the Y-direction shown in the drawing, so that horizontal symmetry of the regenerative output waveform is deformed.

The horizontal non-symmetry of the regenerative output waveform is referred to asymmetry, which is represented by $<[\Delta R(-H(Oe))-\Delta R(+H(Oe))]/[\Delta R(-H\ (Oe))+\Delta R(+H(Oe))]\times 100>$ (R represents resistance), wherein the leakage magnetic field from the recording medium to be applied along the Y-direction shown in the drawing is represented by ±H (Oe; Oerstead). $\Delta R(-H(Oe))$ above means the variation of resistance AR when the leakage magnetic field is −H.

The closer the asymmetry as described above to zero is, the higher becomes the horizontal symmetry of the regenerative output waveform, improving regenerative characteristics.

The inventors of the present invention measured asymmetry of the spin-valve type thin film element when a tensile stress is applied along the Y-direction of the free magnetic layer 31 shown in the drawing along with imposing an additional positive magnetostriction on the free magnetic layer 31.

A uniform magnetostriction of $+2\times 10^{-6}$ was applied to the free magnetic layer 31 while giving tensile stress of 0 MPa, 15 MPa, 70 MPa and 192 MPa along the Y-direction of the spin-valve type thin film element shown in the drawing, thereby investigating the relation between the sensing current Is and asymmetry (%) against respective tensile stresses. The experimental results are shown in FIG. 9.

It is clear from the figure that the larger the tensile stress is, the more asymmetry is deteriorated (departing from zero).

The sensing current dependent slopes of asymmetry by applying respective tensile stresses indicate that, the larger the stress is, the steeper becomes the slope of asymmetry.

Although asymmetry approaches to approximately zero at a sensing current of about 8 mA when a stress of 192 MPa where the slope of the sensing current dependence of asymmetry is largest is applied, asymmetry is radically deteriorated (becomes larger than zero) when the sensing current reaches to 8 mA or more because the slope is so steep.

It is difficult as hitherto described to make asymmetry to approach to zero so long as a large tensile stress is applied along the Y-direction when magnetostriction of the free magnetic layer 31 assumes a positive value. It should be noted that a tensile stress of 200 to 300 MPa is usually applied along the Y-direction shown in the drawing in the spin-valve thin film element, thereby asymmetry is practically thought to be more deteriorated than the experimental result shown in FIG. 9.

SUMMARY OF THE INVENTION

The object of the present invention, which was provided for solving the foregoing problems, is to provide a spin-valve type thin film element so constructed as to obtain favorable asymmetry especially when a tensile stress is applied along the height direction.

The present invention provides a spin-valve type thin film element having; an anti-ferromagnetic layer; a pinned magnetic layer being formed in direct contact with this anti-ferromagnetic layer, the magnetization direction being fixed with an exchange anisotropic magnetic field with the anti-ferromagnetic layer; and a free magnetic layer formed over and/or under said pinned magnetic layer via a non-magnetic conductive layer, the spin-valve type thin film element further provided with a Bias layer for aligning the magnetization direction of the free magnetic layer along the direction to cross with the magnetization direction of the pinned magnetic layer and an conductive layer for imparting a sensing current to the pinned magnetic layer, non-magnetic conductive layer and free magnetic layer, wherein the saturation magnetostriction constant $\lambda s$ is in the range of $-2 \times 10^{-6} \leq \lambda s \leq 0$.

It is preferable in the present invention that the saturation magnetostriction constant $\lambda s$ is in the range of $-1 \times 10^{-6} \leq \lambda s \leq 0.1$.

The saturation magnetostriction constant described above can be appropriately adjusted by changing the composition of the soft magnetic material constructing the free magnetic layer.

The saturation magnetization constant $\lambda s$ of the free magnetic layer can be adjusted within the range of $-2 \times 10^{-6}$ to 0 in the present invention if the composition formula of the Ni—Fe alloy is represented by $Ni_xFe_{100-x}$, the composition ratio x being in the range of $81.5 \leq x \leq 84.5$ in % by weight, when the free magnetic layer is composed of the Ni—Fe alloy.

The saturation magnetization constant $\lambda s$ of the free magnetic layer can be also adjusted within the range of $-1 \times 10^{-6}$ to 0 in the present invention if the composition formula of the Ni—Fe alloy is represented by $Ni_xFe_{100-x}$, the composition ratio x being in the range of $81.5 \leq x \leq 83$ in % by weight, when the free magnetic layer is composed of the Ni—Fe alloy.

It is preferable that the anti-ferromagnetic layer is formed of a Pt—Mn alloy. The Pt—Mn alloy has excellent properties of larger exchange anisotropic magnetic field (Hex) and a higher blocking temperature as an anti-ferromagnetic layer compared with the Fe—Mn alloy conventionally used as anti-ferromagnetic layers.

A X—Mn alloy (X=Pd, Rh, Ru, Ir and Os) or Pt—Mn—X alloy (X=Ni, Pd, Rh, Ru, Ir, Cr and Co) may be used in the present invention instead of the Pt—Mn alloy.

While the top and bottom surfaces and the opposite side (referred to a height side hereinafter) to the ABS surface of the spin-valve type thin layer element are covered with insulation films and only the ABS surface is exposed to outside, a tensile stress is applied along the height direction in the spin-valve type thin film because its thermal expansion coefficient is larger than the thermal expansion coefficient of the insulation film.

However, magnetization of the free magnetic layer is induced along the height direction due to the inverse magnetostriction effect when the saturation magnetostriction constant $\lambda s$ assumes a positive value, arising a problem that asymmetry is deteriorated.

Accordingly, the inventors of the present invention noted the fact that asymmetry is improved (approaches to zero) by giving a negative value to the saturation magnetostriction constant $\lambda s$ of the free magnetic layer since magnetization of the free magnetic layer is induced along the track width direction due to the inverse magnetostriction effect.

The experiments and their results with respect to the saturation magnetostriction constant $\lambda s$ are described hereinafter.

Using a Ni—Fe alloy for the free magnetic layer, a plurality of multi-layered films having different composition ratios of this Ni—Fe alloy were at first formed in the experiments and the saturation magnetostriction constant $\lambda s$ of the free magnetic layers in respective multi-layered films was determined. The experimental results are shown in FIG. 4.

The material and film thickness of each layer in the multi-layered films are as follows: substrate/underlayer: Ta (3 nm)/anti-ferromagnetic layer: Pt—Mn (30 nm)/pinned magnetic layer: Ni—Fe (3 nm)/nonmagnetic conductive layer: Cu (2 nm)/free magnetic layer: Ni—Fe (8 nm)/protective layer: Ta (5 nm).

As shown in FIG. 4, it is evident that the saturation magnetostriction constant $\lambda s$ is nearly zero when the composition ratio of Ni is 81.5%. It is also evident that, on the other hand, the saturation magnetostriction constant $\lambda s$ assumes a negative value when the composition ratio of Ni is more than 81.5%.

Then, asymmetry was measured while a tensile stress of about 300 MPa was applied along the height direction in each multi-layered film along with flowing a sensing current Is of 5 mA and impressing a magnetic field of 200 Oe along the height direction. The experimental results are shown in FIG. 5.

As is shown in FIG. 5, asymmetry is about −5% when the saturation magnetostriction constant $\lambda s$ is zero, the asymmetry approaching to zero more and more when the absolute value of the saturation magnetostriction constant $\lambda s$ assumes a negative value with a larger absolute value.

Although asymmetry as close as zero possible is preferable for obtaining a good reproduction characteristic due to high horizontal symmetry of the reproduced output waveform, too large absolute value of the negative saturation magnetostriction constant λs is not preferable since Barkhausen noise becomes too large as will be described hereinafter.

Accordingly, the saturation magnetostriction constant λs is determined to be within the range of $-2\times10^{-6} \leq \lambda s \leq 0$ in the present invention. Asymmetry can be limited within ±5% as shown in FIG. 5 when λs is in the range described above, being preferable since the Barkhausen noise can be adjusted to a relatively low level.

It can be comprehended that the composition ratio of Ni may be determined within a range o 81.5 to 84.5% by weight as shown in FIG. 4 for adjusting the saturation magnetostriction constant λs within the range of $-2\times10^{-6}$ to 0 when the free magnetic layer is composed of a Ni—Fe alloy.

FIG. 6 is a graph showing the relation between the saturation magnetostriction constant λs and Barkhausen noise.

As shown in the graph, the Barkhausen noise is minimized when the saturation magnetostriction constant λs is set to zero, indicating that the larger the absolute value of the saturation magnetostriction constant λs is, the more the Barkhausen noise is increased.

The larger saturation magnetostriction constant λs makes the Barkhausen noise larger because a magnetic barrier is generated in the free magnetic layer. While a tensile stress is applied along the height direction in the spin-valve type thin film element as described previously, the stress is not always applied along the height direction at some local site.

Uneven distribution of the stress direction makes the magnetic barrier to be easily generated at the portion having different stress directions when the saturation magnetostriction constant λs is increased, making the Barkhausen noise larger.

Since the Barkhausen noise as small as possible is preferable, it can be understood that the saturation magnetostriction constant λs should be limited within the range of $-1\times10^{-6} \leq \lambda s \leq 1\times10^{-6}$ for restricting the Barkhausen noise within 5% based on the experimental results shown in FIG. 6. It can be also understood that the composition ratio of Ni should be in the range of 80.0 to 83.0% by weight as shown in FIG. 3 when the free magnetic layer is composed of the Ni—Fe alloy for restricting the saturation magnetostriction constant λs within the range described above.

It is considered in the present invention to determine the range of the saturation magnetostriction constant λs of the free magnetic layer so as to limit the absolute value of asymmetry as well as the Barkhausen noise within 5% based on the experimental results shown in FIG. 4 and FIG. 5. Accordingly, the preferable saturation magnetostriction constant λs of the free magnetic layer in the present invention is in the range of $-1\times10^{-6} \leq \lambda s \leq 0$.

It is also evident that, when the free magnetic layer is composed of the Ni—Fe alloy, the composition ratio should be within the range of 81.5 to 83.0% by weight as shown in FIG. 4 in order to limit the saturation magnetostriction constant of the free magnetic layer within the range described above.

As hitherto described, magnetization of the free magnetic layer is induced along the track width direction by the inverse magnetostriction effect if the saturation magnetostriction constant λs of the free magnetic layer is limited within the range of $-2\times10^{-6}$ to zero, more preferably within the range of $-1\times10^{-6}$ to zero, when the tensile stress is applied along the height direction of the spin-valve type thin film element, thereby making it possible to set asymmetry close to zero since an advantageous inversion of magnetization is induced against the leakage magnetic field from the recording medium. The Barkhausen noise can be also diminished when the magnetostriction constant λs of the free magnetic layer remains within the range described above.

DESCRIPTION OF THE PREFERRED EMBODIMENT

Figure 1:
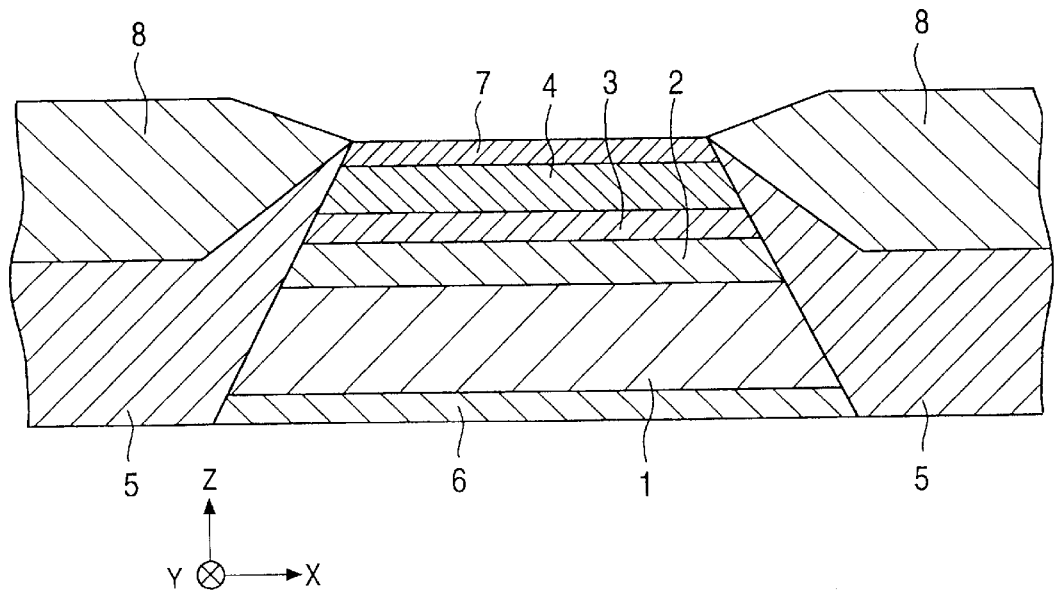
FIG. 1 is a cross section of the structure of the spin-valve type thin film element according to the first embodiment of the present invention viewed along the ABS side surface.

FIG. 1 is a cross section of the structure of the spin-valve type thin film element according to the first embodiment of the present invention viewed along the ABS side surface. Only the center portion of the element extended along the X-direction is shown by a dotted line in FIG. 1.

Figure 8:
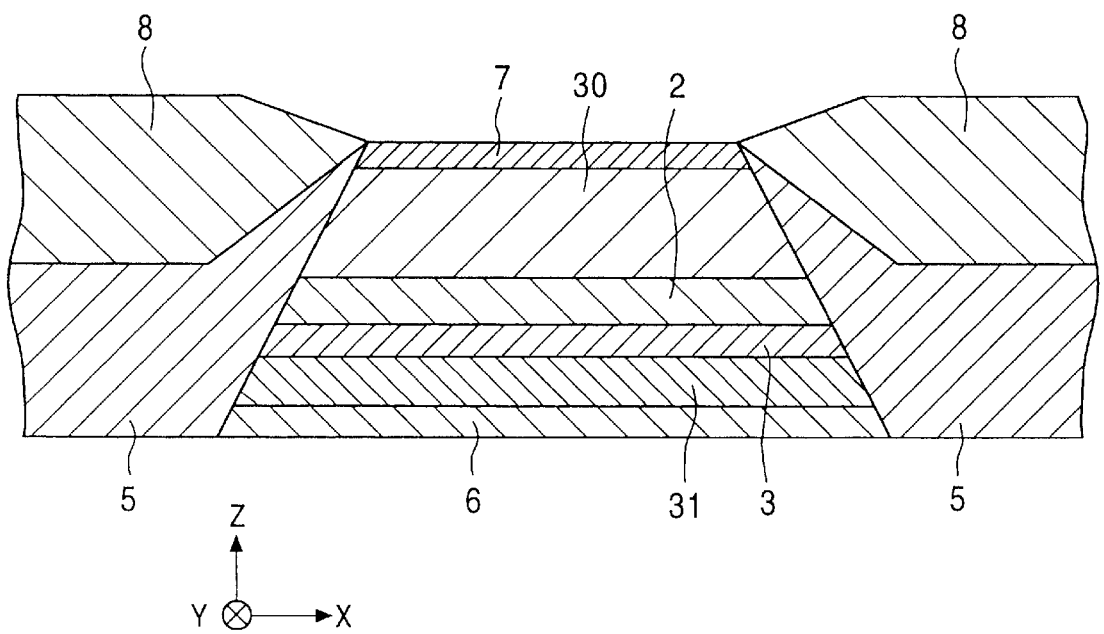
FIG. 8 is a cross section of the structure of the spin-valve type thin film element viewed along the ABS side surface.

The top and bottom surfaces and the surface at the height side of the spin-valve type thin film element shown in FIG. 1 are covered with insulation films and only the ABS surface (the front surface) is exposed to outside as seen in the conventional spin-valve type thin film element shown in FIG. 8.

The spin-valve type thin film element shown in FIG. 1 has a larger thermal expansion coefficient than that of the insulation film covering the spin valve type thin film element, so that a tensile stress of about 200 MPa to 300 MPa is applied along the Y-direction (the height direction) shown in the drawing in the spin-valve type thin film element.

The spin-valve type thin film element shown in FIG. 1 is mounted at the end of the trailing side of the floating type slider provided in the hard disk device to sense the recording magnetic field of the hard disk. The travelling direction of the magnetic recording medium such as a hard disk is along the Z-direction while the direction of the leakage magnetic field from the magnetic recording medium is along the Y-direction.

A underlayer 6 formed of a non-magnetic material such as Ta (tantalum) is formed at the bottom of the spin-valve type thin film element shown in FIG. 1. An anti-ferromagnetic layer 1 and a fixed magnetic layer (a pinned magnetic layer) 2 is layered on this underlayer 6. An exchange anisotropic magnetic field can be obtained at the interface of both layers formed by layering the anti-ferromagnetic layer 1 and the fixed pinned magnetic layer 2, the direction of magnetization of the pinned magnetic layer 2 being fixed along the Y-direction forming a single magnetic domain state.

The Pt—Mn (platinum—manganese) alloy is used for the anti-ferromagnetic layer in the present invention. The Pt—Mn alloy has a better heat resistance than the Fe—Mn alloy and a high blocking temperature along with having excellent characteristics, for example high exchange anisotropic magnetic field (Hex), as the anti-ferromagnetic material.

A X—Mn (X=Pd, Rh, Ru, Ir and Os) or Pt—Mn—X (X=Ni, Pd, Rh, Ru, Ir, Cr and Co) alloy may be used instead of the Pt—Mn alloy.

It is preferable that the composition ratios of the Pt—Mn alloy and X—Mn alloy is 1:9 to 3:7 or 1:0.7 to 1:1.3 in the (Pt, X) to Mn ratio.

The pinned magnetic layer 2 is formed of a Ni—Fe (nickel—iron) alloy, Co—Fe (cobalt—iron) alloy or Co—Fe—Ni alloy.

A non-magnetic conductive layer 3 with a low electric resistance made of, for example, Cu (copper) is formed on the pinned magnetic layer 2, on which a free magnetic layer 4 and a protective layer 7 of, for example, Ta are further layered. The free magnetic layer 4 is formed of a magnetic material to be used in the pinned magnetic layer 2 described above.

The both side faces of the six layers from the underlayer 6 to the protective layer 7 are shaved off to form inclined surfaces after being layered by a sputtering method. Hard bias layers 5, 5 are formed at both sides of the layer 6, conductive layers 8, 8 being further formed on the hard bias layers 5.

The hard bias layers 5, 5 are formed of, for example, a Co—Pt (cobalt—platinum) alloy or Co—Cr—Pt (cobalt—chromium—platinum) alloy. The conductive layer is formed of W (tungsten) or Cu (copper).

Since the hard bias layers 5, 5 are magnetized along the X-direction (the track direction) as shown in the drawing, magnetization of the free magnetic layer 4 is aligned along the X-direction by being influenced with the hard bias layers 5, 5.

Figure 2:
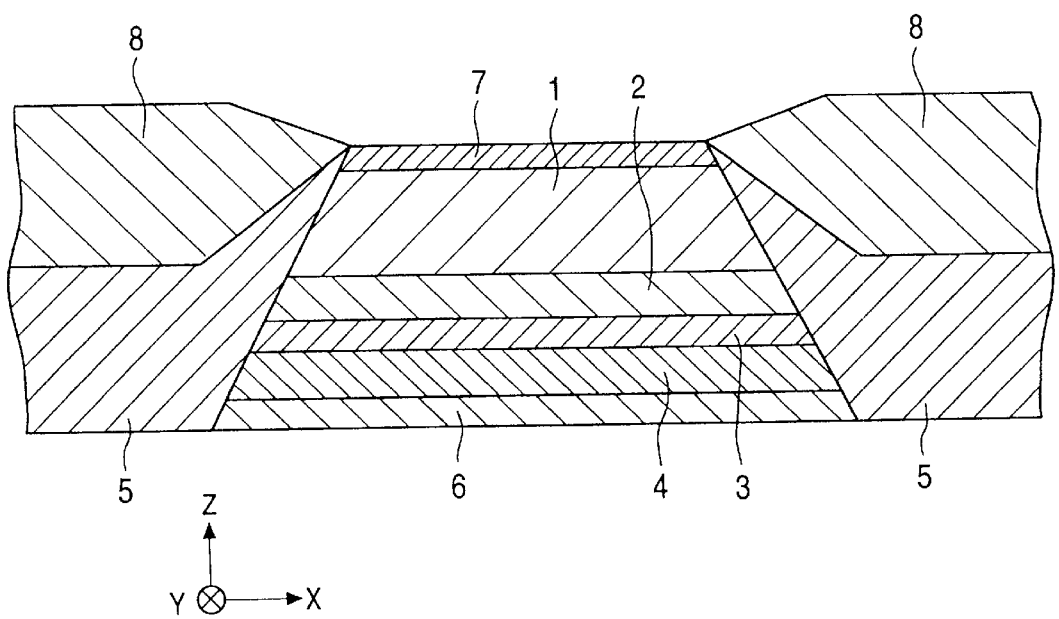
FIG. 2 is a cross section of the structure of the spin-valve type thin film element according to the second embodiment of the present invention viewed along the ABS side surface.

FIG. 2 is a cross section of the structure of the spin-valve type thin film element according to the second embodiment of the present invention viewed along the ABS surface side.

The spin-valve type thin film element is illustrated in FIG. 2 in a reverse stacking order of the spin-valve type thin film element shown in FIG. 1. In other word, a free magnetic layer 4, non-magnetic conductive layer 3, pinned magnetic layer 2 and anti-ferromagnetic layer 1 are continuously layered in this order on the underlayer 6 in FIG. 2.

The free magnetic layer 4 of the spin-valve type thin film element shown in FIG. 2 is disposed in adjoining relation to the face having ticker film thickness of the hard vias layers 5, 5 because the free magnetic layer is formed downward of the anti-ferromagnetic layer 1, thereby making it easy to align magnetization of the free magnetic layer 4.

While the anti-ferromagnetic layer 1 shown in FIG. 2 is formed of the Pt—Mn alloy, X—Mn alloy or Pt—Mn—X alloy like the anti-ferromagnetic layer 1 shown in FIG. 1, it is possible to generate the exchange anisotropic magnetic field at the interface even when the pinned magnetic layer 2 is formed either at the top or at the bottom of the anti-ferromagnetic layer by using the Pt—Mn alloy, X—Mn alloy or Pt—Mn—X alloy as an anti-ferromagnetic material.

A static current (a sensing current) is imparted from the conductive layer 8 to the pinned magnetic layer 2, non-magnetic conductive layer 3 and free magnetic layer 4 in the spin valve type thin film element shown in FIG. 1 and FIG. 2. Moreover, when a magnetic field is applied to the Y-direction from the recording medium, the magnetization direction of the free magnetic layer 4 turns from the X-direction to the Y-direction when a magnetic field is applied along the Y-direction from the recording medium. Then, scattering state of conductive electrons are varied st the interface between the non-magnetic conductive layer 3 and free magnetic layer 4, thereby changing the electric resistance and making it possible to obtain sensing output signals.

The saturation magnetostriction constant $\lambda s$ of the free magnetic layer 4 described above is set to a negative value in the present invention in order to appropriately align the magnetization direction of the free magnetic layer 4.

Figure 3:
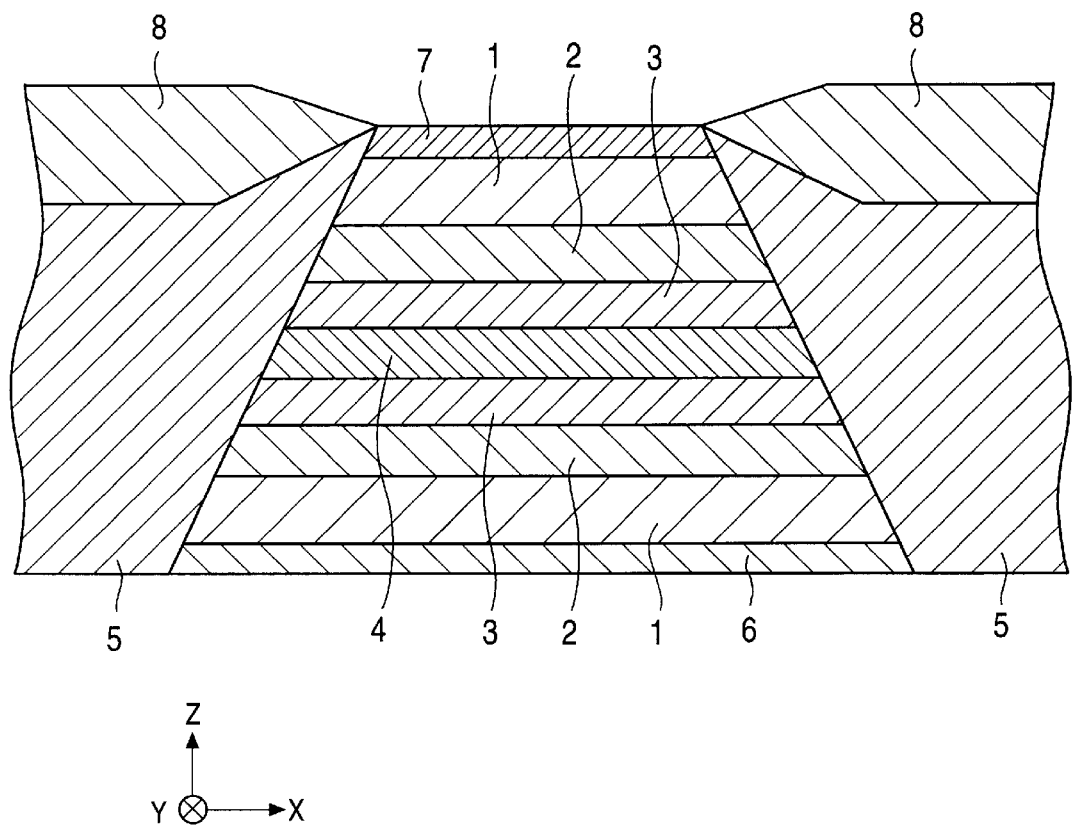
FIG. 3 is a cross section of the structure of the spin-valve type thin film element according to the third embodiment of the present invention viewed along the ABS side surface.
Figure 4:
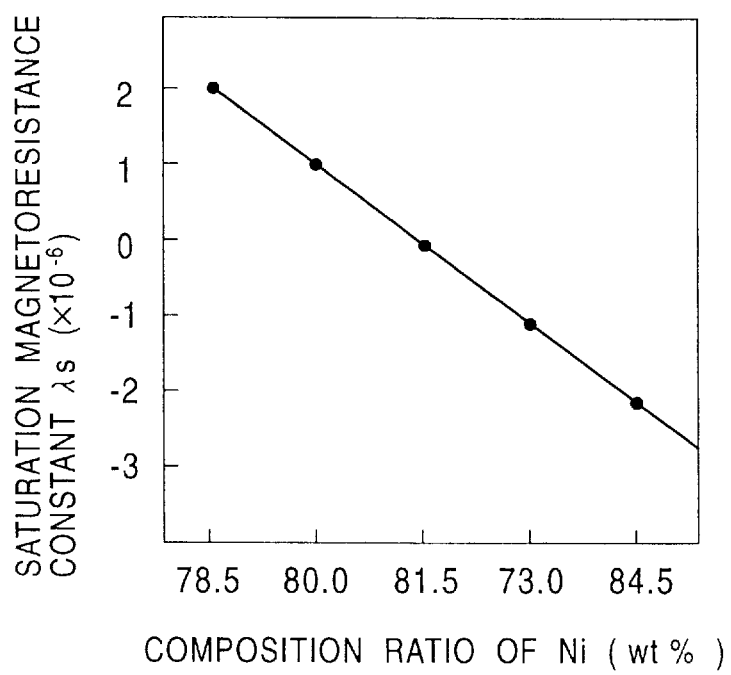
FIG. 4 is a graph showing the relation between the composition ratio of Ni and the magnetostriction constant λs of the free magnetic layer when the free magnetic layer is formed of a Ni—Fe alloy.
Figure 5:
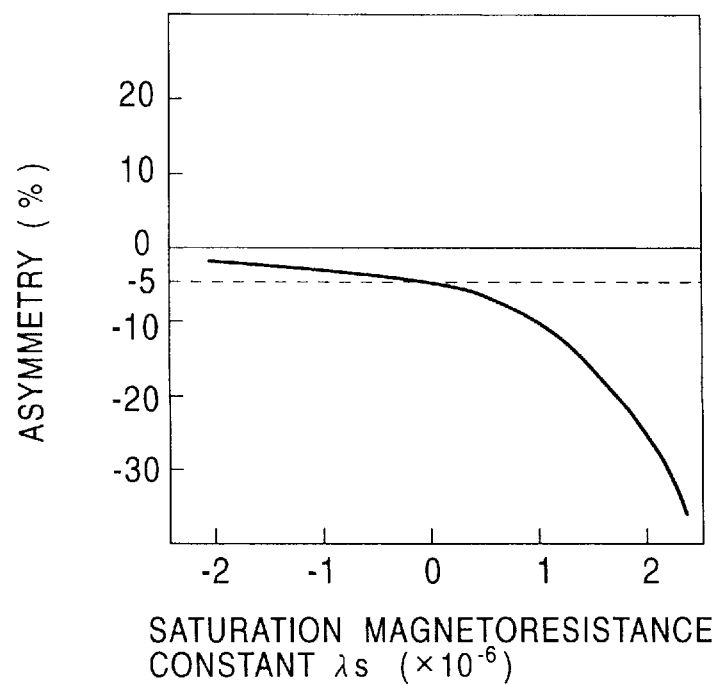
FIG. 5 is a graph showing the relation between the magnetostriction constant λs of the free magnetic layer and asymmetry when the free magnetic layer is formed of a Ni—Fe alloy along with applying a tensile stress of 300 MPa along the height direction of the free magnetic layer.
Figure 6:
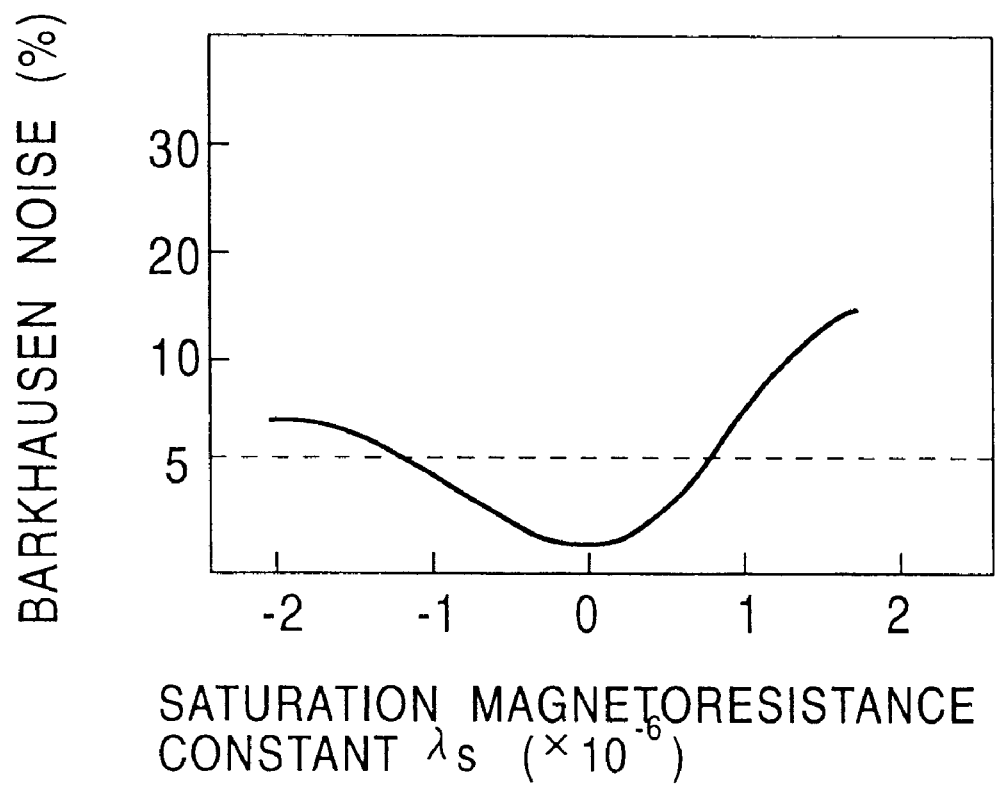
FIG. 6 is a graph showing the relation between the magnetostriction constant λs of the free magnetic layer and the Barkhausen noise when the free magnetic layer is formed of a Ni—Fe alloy along with applying a tensile stress of 300 MPa along the height direction of the free magnetic layer.

FIG. 3 is a cross section showing the structure of the dual spin-valve type thin film element according to the third embodiment of the present invention.

As shown in the drawing, an underlayer 6, an anti-ferromagnetic layer 1, a pinned magnetic layer 2, a non-magnetic conductive layer 3 and a free magnetic layer 4 are laminated in this order from the bottom to the top. A non-magnetic conductive layer 3, a pinned magnetic layer 2, an anti-ferromagnetic layer 1 and a protective layer 7 are also continuously formed on the free magnetic layer 4.

Hard bias layers 5, 5 and conductive layers 8, 8 are laminated at both sides of the multilayer film from the underlayer 6 to the protective layer 7.

Each layer is formed of the same material as described in FIG. 1 and FIG. 2.

The pinned magnetic layer 2 is also fixed along the Y direction shown in the drawing forming a single magnetic domain state by the exchange anisotropic magnetic field in this dual spin-valve type thin film element like in the single spin-valve type thin film element shown in FIG. 1, thereby magnetization of the free magnetic layer 4 being aligned along the X-direction by being affected by the hard bias layers 5, 5.

A static current is imparted from the conductive layer 8 to the free magnetic layer 4, non-magnetic conductive layer 3 and pinned magnetic layer 2. In addition, magnetization of the free magnetic layer 4 is turned from the X-direction to the Y-direction when a magnetic field is applied along the Y-direction from the recording medium, causing scattering of spin-dependent conductive electrons at the interfaces between the non-magnetic conductive layer 3 and free magnetic layer 4, and between the non-magnetic conductive layer 3 and pinned magnetic layer 2, to change the electric resistance and to sense the leakage magnetic field from the recording medium.

While the sites where scattering of the spin-dependent electrons occurs are located at two interfaces between the non-magnetic conductive layer 3 and free magnetic layer 4, and between the non-magnetic conductive layer 3 and pinned magnetic layer 2, in the single spin-valve type thin film element shown in FIG. 1 and FIG. 2, the sites where scattering of the spin-dependent electrons occurs are located at four interfaces in all, that is, two interfaces between the non-magnetic conductive layer 3 and free magnetic layer 4 and two interfaces between the non-magnetic conductive layer 3 and pinned magnetic layer 2, in the dual spin-valve type thin film element shown in FIG. 3. Accordingly, it is possible for the dual spin-valve type thin film element to obtain a larger rate of the resistance change than the single spin-valve type thin film element.

As described previously, since only the ABS surface (the front surface) is exposed to outside and the other surfaces are covered with insulation films in the spin-valve type thin film element shown in FIG. 1, a tensile stress along the Y-direction (the height direction) shown in the drawing is applied in the spin-valve type thin film element.

Accordingly, the free magnetic layer 4 can be induced along the X-direction (the track width direction) shown in the drawing due to the inverse magnetostriction effect by setting the saturation magnetization constant λs of the free magnetic layer 4 to a negative value, thus making it possible to appropriately align magnetization of the free magnetic layer 4 along the X-direction shown in the drawing.

As a result of the procedures described above, magnetization of the free magnetic layer 4 is readily reversed by the leakage magnetic field from the recording medium, thereby enhancing horizontal symmetry of the waveform of the reproduced output signals to allow so-called asymmetry to approach to zero as close as possible.

For the purpose of approaching asymmetry to zero as close as possible, the saturation magnetostriction constant λs of the free magnetic layer 4 is set to a negative value with a large absolute value. However, a too large absolute value is not preferable since the Barkhausen noise is enlarged.

The preferable saturation magnetostriction constant λs of the free magnetic layer 4 is adjusted within a range of $-2\times10^{-6} \leq \lambda s \leq 0$, more preferably within the range of $-1\times10^{-6} \leq \lambda s \leq 0$, in the present invention. The λs value within this range enables asymmetry to be more close to zero along with more reducing the Barkhausen noise.

For adjusting the saturation magnetostriction constant λs of the free magnetic layer 4 within the range described above, the composition ratio of the soft magnetic material constructing the free magnetic layer should be appropriately adjusted.

For example, it is possible to limit the saturation magnetostriction constant λs of the free magnetic layer 4 within the range of $-2\times10^{-6} \leq \lambda s \leq 0$ by adjusting the composition ratio of Ni to 81.5 to 84.5% by weight with a balance of Fe when the free magnetic layer 4 is formed of a Ni—Fe alloy.

Likewise, it is possible to limit the saturation magnetostriction constant λs of the free magnetic layer 4 within the range of $-1\times10^{-6} \leq \lambda s \leq 0$ by adjusting the composition ratio of Ni to 81.5 to 83.0% by weight with a balance of Fe when the free magnetic layer 4 is formed of a Ni—Fe alloy.

When the saturation magnetostriction constant λs of the pinned magnetic layer 2 is set to a negative value as a result of forming the pinned magnetic layer 2 of the same material and same composition ratio as the free magnetic layer 4, magnetization of the pinned magnetic layer 2 is induced along the X-direction (the track width direction) shown in the drawing with a slope by the inverse magnetostriction effect, since a tensile stress is also applied along the Y-direction (the height direction) shown in the drawing to the pinned magnetic layer 2 like the free magnetic layer 4.

As hitherto described, while magnetization of the pinned magnetic layer 2 is fixed by being aligned along the Y-direction shown in the drawing, asymmetry may be deteriorated when the magnetization direction of the pinned magnetic layer 2 is inclined from the Y-direction shown in the drawing by the inverse magnetostriction effect.

Therefore, an anti-ferromagnetic layer 1 that generates a large exchange anisotropic magnetic field at the interface of the pinned magnetic layer 2 is selected in order to tightly fix magnetization of the pinned magnetic layer 2 along the Y-direction shown in the drawing.

The Pt—Mn alloy is used for the anti-ferromagnetic layer 1 in the present invention. The Pt—Mn alloy with a composition ratio between Pt and Mn of 1:1 exhibits a large exchange anisotropic magnetic field, about 900 Oe in maximum. Since the alloy has an excellent heat resistance along with having a blocking temperature of as high as about 380° C., magnetization of the pinned magnetic layer 2 is never inclined from the Y-direction described in the drawing even when the spin-valve type thin film element is operated, for example, in a high temperature.

As described precisely above, magnetization of the free magnetic layer 4 can be induced along the X-direction (the track width direction) in the present invention due to the inverse magnetostriction effect by adjusting the saturation magnetostriction constant λs of the free magnetic layer 4 within $-2\times10^{-6} \leq \lambda s \leq 0$, preferably to $-1\times10^{-6} \leq \lambda s \leq 0$, when a tensile stress is applied along the Y-direction (the height direction) of the spin-valve type thin film element. Accordingly, magnetization of the free magnetic layer 4 can be appropriately aligned along the X-direction (the track direction) shown in the drawing, making it possible to obtain desirable asymmetry (asymmetry as close to zero as possible).

The tensile stress is applied along the Y-direction (the height direction) of the spin-valve type thin film element because the surfaces except the ABS surface of the spin-valve type thin film element are covered with insulation films, consequently the thermal expansion coefficient of the spin-valve type thin film element being higher as compared with the thermal expansion coefficient of the insulation film. The materials of the insulation film are, for example, $Al_2O_3$ (aluminum oxide), AlN (aluminum nitride), SiC (silicon carbide) and c (diamond like carbon), their thermal expansion coefficient being $8\times10^{-6}$ or more.

When the thermal expansion coefficient of the spin-valve type thin film element is smaller than the thermal expansion coefficient of the film covering the surfaces of the spin-valve type thin film element except the ABS surface, a tensile stress to make the spin-valve type thin film element to shrink along the height direction is applied to the spin-valve type thin film element.

In the event as described above, it is possible to induce magnetization of the free magnetic layer 4 along the track direction due to the inverse magnetostriction effect by setting the saturation magnetostriction constant λs of the magnetic layer 4 to a positive value, thus enabling asymmetry to be close to zero.

EXAMPLE

The relation between the sensing current Is and asymmetry was determined when a tensile stress was applied along the Y-direction (the height direction) of the spin valve type thin film element shown in FIG. 1 and the saturation magnetostriction constant λs of the free magnetic layer 4 is adjusted to $-1\times10^{-6}$. The experimental results are shown in FIG. 7.

Figure 7:
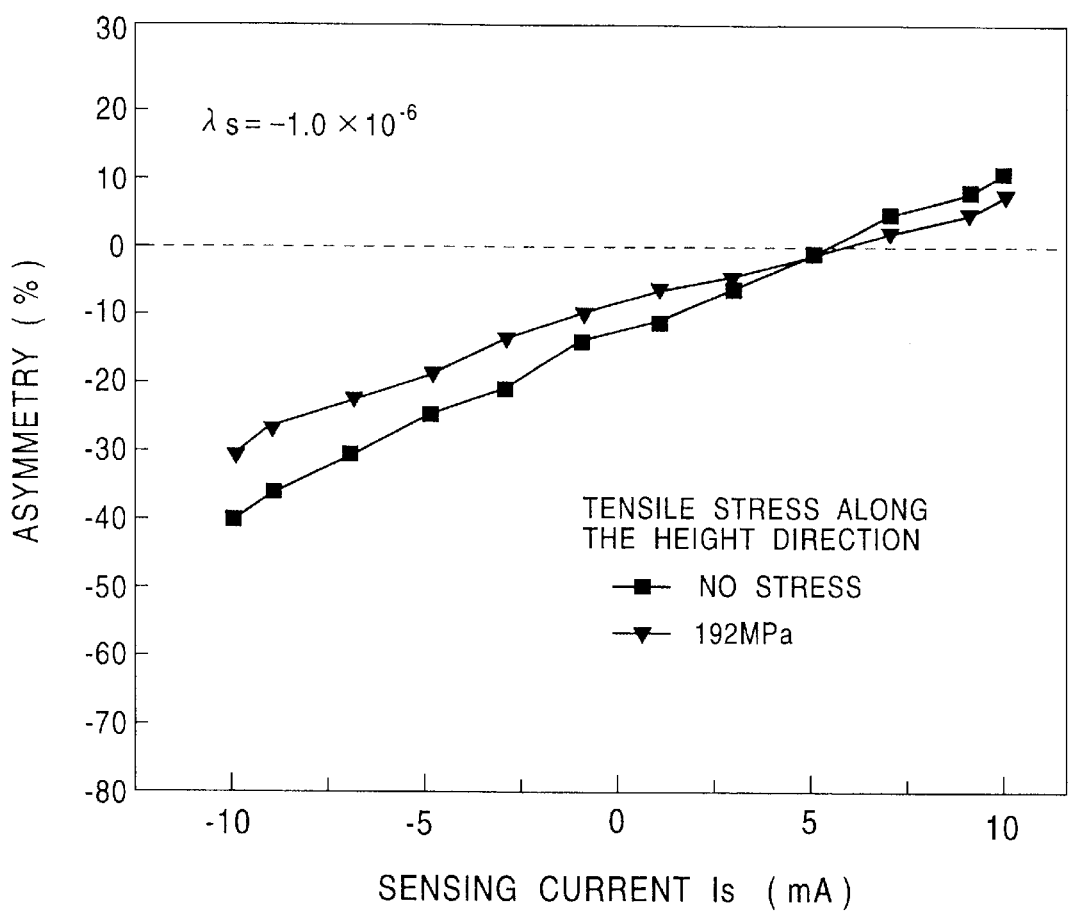
FIG. 7 is a graph showing the relation between the sensing current under respective stresses and asymmetry when the magnetostriction constant λs of the free magnetic layer is adjusted to $-1\times10^{-6}$ along with applying a tensile stresses of 0 MPa and 192 MPa along the height direction of the free magnetic layer.

It is evident from FIG. 7 that asymmetry is more close to zero when a tensile stress of 192 MPa is applied than when no tensile stress (0 MPa) is applied.

This is because, when a tensile stress is applied while the magnetostriction constant λs of the free magnetic layer 4 is a negative value, magnetization of the free magnetic layer 4 is induced along the X-direction shown in the drawing due to the inverse magnetostriction effect.

Figure 9:
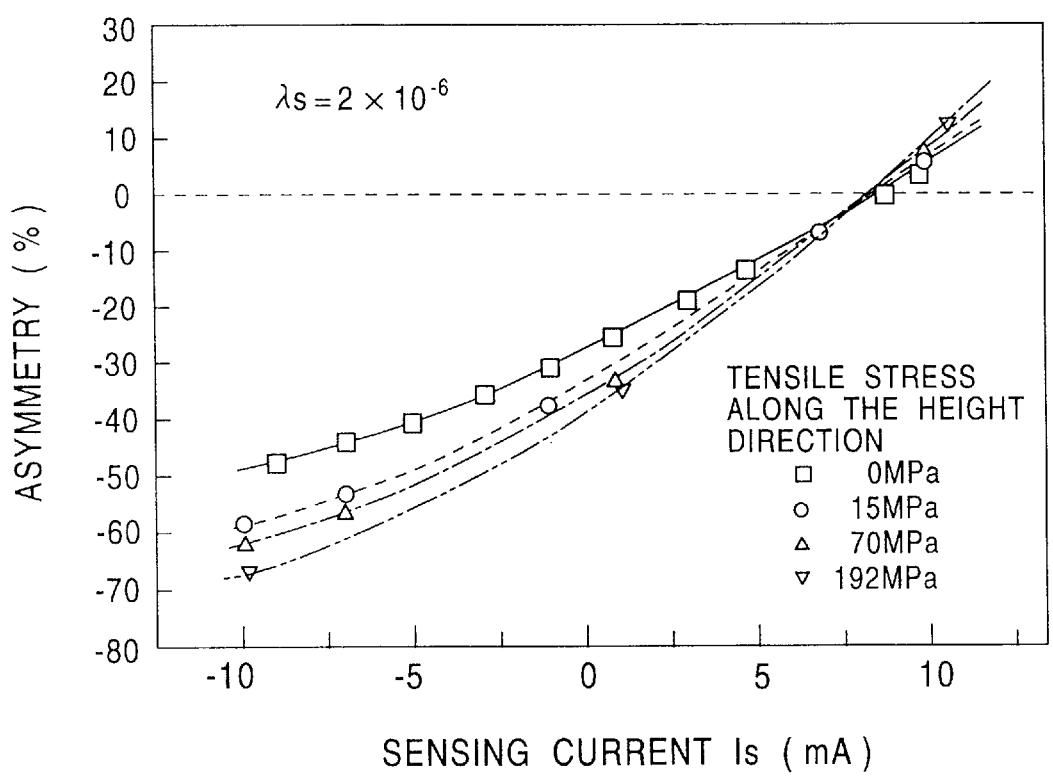
FIG. 9 is a graph showing the relation between the sensing current under respective stresses and asymmetry when the magnetostriction constant λs of the free magnetic layer is adjusted to $-2\times10^{-6}$ along with applying a tensile stresses of 0 MPa, 15 MPa, 70 MPa and 192 MPa along the height direction of the free magnetic layer.

Let compare FIG. 7 with FIG. 9. FIG. 9 is a graph showing the relation between the sensing current Is and asymmetry when the free magnetic layer 31 has a saturation magnetostriction constant λs of $2\times10^{-6}$.

It is known that a tensile stress of about 200 to 300 MPa is applied along the height direction of the actual spin-valve type thin film element. When asymmetry under the action of a stress of 192 MPa shown in FIG. 7 that is closest to the value described above is compared with asymmetry under the action of a stress of 192 MPa shown in FIG. 9, asymmetry in FIG. 9 is about −70% contrary to asymmetry of about −30% in FIG. 7 when the sensing current is, for example, 10 mA.

It can be seen as described above that a negative value of the saturation magnetostriction constant λs of the free magnetic layer 4 is preferable for obtaining desirable asymmetry when a tensile stress is applied to the spin-valve type thin film element.

Asymmetry under the action of the stress of 192 MPa as shown in FIG. 9 becomes nearly zero when the sensing current is about 8 mA. However, the slope of asymmetry is so steep that asymmetry is rapidly increased when the sensing current is 8 mA or more.

On the contrary, asymmetry under the action of a stress of 192 MPa shown in FIG. 7 is nearly zero when the sensing current is about 5 mA. However, asymmetry is not so largely increased when the sensing current is 5 mA or more because the slope of asymmetry is very gentle.

When the saturation magnetostriction constant λs of the free magnetic layer 4 is a negative value as described above, desirable asymmetry can be attained in a wide range of the sensing current.

According to the present invention as hitherto described, it is possible to induce magnetization of the free magnetic layer along the track width direction along with appropriately aligning magnetization of the free magnetic layer along the track width direction due to the inverse magnetostriction effect in the range of the saturation magnetostriction constant λs of the free magnetic layer of $-2\times10^{-6}\leq\lambda s\leq0$, more preferably to $-1\times10^{-6}\leq\lambda s\leq0$, when a tensile stress is applied along the height direction of the spin-valve type thin film element.

Accordingly, magnetization of the free magnetic layer is favorably reversed in reproduction, making it possible to adjust horizontal asymmetry of the reproduced output waveform—or so called asymmetry—close to zero.

When the saturation magnetostriction constant λs of the free magnetic layer remains within the range as described above, asymmetry can be set as close to zero as possible along with making it possible to reduce the Barkhausen noise.

What is claimed is:

1. A spin-valve thin film element having;

an anti-ferromagnetic layer;

a pinned magnetic layer formed in direct contact with said anti-ferromagnetic layer having a magnetization direction fixed by an exchange anisotropic magnetic field in correspondence with said anti-ferromagnetic layer;

a free magnetic layer formed at least one of over and under said pinned magnetic layer via a non-magnetic conductive layer, a bias layer aligning a magnetization direction of said free magnetic layer along a direction substantially perpendicular to the magnetization direction of said pinned magnetic layer, and a pair of conductive layers through which a sensing current is imparted to the pinned magnetic layer, non-magnetic conductive layer and free magnetic layer, said sensing current operative to sense a recording magnetic field from a recording medium, wherein a saturation magnetostriction constant λs of the free magnetic layer is in the range of $-2\times10^{-6}\leq\lambda s\leq0$.

2. A spin-valve thin film element according to claim 1, wherein the saturation magnetostriction constant λs of the free magnetic layer is in the range of $-1\times10^{-6}\leq\lambda s\leq0$.

3. A spin-valve thin film element according to claim 1, the free magnetic layer being formed of a $Ni_xFe_{100-x}$ alloy wherein x is in the range $81.5\leq x\leq84.5$ in % weight.

4. A spin-valve thin film element according to claim 1, wherein the anti-ferromagnetic layer is formed of a Pt—Mn alloy.

5. A spin-valve thin film element according to claim 2, the free magnetic layer being formed of a $Ni_xFe_{100-x}$ alloy wherein x is in the range $81.5\leq x\leq83$ in % weight.

6. A spin-valve thin film element according to claim 1, the anti-ferromagnetic layer being formed of a X—Mn alloy wherein X is at least one element selected from the group consisting of Pd, Rh, Ru, Ir and Os.

7. A spin-valve thin film element according to claim 1, the anti-ferromagnetic layer being formed of a Pt—Mn—X alloy wherein X is at least one element selected from the group consisting of Ni, Pd, Rh, Ir, Cr and Co.

* * * * *